(12) United States Patent
Pangerl et al.

(10) Patent No.: US 8,800,372 B1
(45) Date of Patent: Aug. 12, 2014

(54) NONCONTACT MEASUREMENT AND WIRELESS TRANSMISSION SYSTEM

(76) Inventors: Michael A. Pangerl, Princeton, MN (US); Richard L. Philipp, Mound, MN (US); Richard A. Jobe, Rogers, MN (US)

( * ) Notice: Subject to any disclaimer, the term of this patent is extended or adjusted under 35 U.S.C. 154(b) by 316 days.

(21) Appl. No.: 13/456,313

(22) Filed: Apr. 26, 2012

(51) Int. Cl.
*G01N 29/00* (2006.01)

(52) U.S. Cl.
USPC .............................................. 73/632; 73/146

(58) Field of Classification Search
USPC .......... 73/632, 146, 866.5; 340/438, 453, 459
See application file for complete search history.

(56) References Cited

U.S. PATENT DOCUMENTS

| | | | | | |
|---|---|---|---|---|---|
| 4,266,633 | A | * | 5/1981 | Barabino et al. | 188/1.11 W |
| 6,006,868 | A | * | 12/1999 | Klink | 188/1.11 W |
| 7,174,646 | B2 | * | 2/2007 | Corghi | 33/203.18 |
| 8,066,313 | B2 | * | 11/2011 | Carnevali | 296/24.34 |
| 8,192,095 | B2 | * | 6/2012 | Kortan et al. | 396/419 |
| 8,310,356 | B2 | * | 11/2012 | Evans et al. | 340/454 |
| 2008/0072670 | A1 | * | 3/2008 | Brandmeier et al. | 73/493 |
| 2011/0254679 | A1 | * | 10/2011 | Todd et al. | 340/454 |

FOREIGN PATENT DOCUMENTS

ZA      WO2013011490      *   1/2013

* cited by examiner

*Primary Examiner* — J M Saint Surin

(57) ABSTRACT

A noncontact measurement and wireless transmission system for measuring distances. The noncontact measurement and wireless transmission system includes a support member; a measurement assembly being supported by the support member; and a transmitter being in operable communication with the measurement assembly for transmitting data output to a computer system for analysis.

3 Claims, 2 Drawing Sheets

NONCONTACT MEASUREMENT AND WIRELESS TRANSMISSION SYSTEM

BACKGROUND OF THE INVENTION

1. Field of the Invention

The present invention relates to sensors and more particularly pertains to a new noncontact measurement and wireless transmission system for measuring distances.

2. Description of the Prior Art

The use of sensors is known in the prior art. More specifically, sensors heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a wireless data transmission between a tractor and a trailer using infrared units and transmitters and receivers to measure the distance between the tractor and trailer. Another prior art includes a proximity sensor which can be an ultrasound sensor mounted to the back of a vehicle with a wireless transmitter. Further another prior art includes a system for measuring the deflection of a rotating shaft using a noncontact sensor being in communication with a wireless transmitter which sends the data to a computer to be analyze the deflection. In addition, another prior art includes a sensor system including a first conductive medium affixed to an inward surface of the tread ring and a second conductive medium affixed to the outward surface of the casing and a sensor is connected to the second conductive medium. Yet, another prior art includes a device for measuring distance using ultrasound. While these devices fulfill their respective, particular objectives and requirements, the aforementioned patents do not disclose a new noncontact measurement and wireless transmission system.

SUMMARY OF THE INVENTION

The general purpose of the present invention, which will be described subsequently in greater detail, is to provide a new noncontact measurement and wireless transmission system which has many of the advantages of the sensors mentioned heretofore and many novel features that result in a new noncontact measurement and wireless transmission system which is not anticipated, rendered obvious, suggested, or even implied by any of the prior art sensors, either alone or in any combination thereof. The present invention includes a support member; a measurement assembly being supported by the support member; and a transmitter being in operable communication with the measurement assembly for transmitting data output to a computer system for analysis. None of the prior art includes the combination of the elements of the present invention.

There has thus been outlined, rather broadly, the more important features of the noncontact measurement and wireless transmission system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new noncontact measurement and wireless transmission system which has many of the advantages of the sensors mentioned heretofore and many novel features that result in a new noncontact measurement and wireless transmission system which is not anticipated, rendered obvious, suggested, or even implied by any of the prior art sensors, either alone or in any combination thereof.

Still another object of the present invention is to provide a new noncontact measurement and wireless transmission system for measuring distances.

Still yet another object of the present invention is to provide a new noncontact measurement and wireless transmission system that measures the distance between objects.

Even still another object of the present invention is to provide a new noncontact measurement and wireless transmission system that measures the distance one object travels relative to a base object.

Yet still another object of the present invention is to provide a new noncontact measurement and wireless transmission system that measures the distance and temporarily stores the data in a microprocessor which is then transmitted via the wireless transmitter to a data processor.

Further still another object of the present invention is to provide a new noncontact measurement and wireless transmission system that transmits temporarily store data to a computer which analyzes the data.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
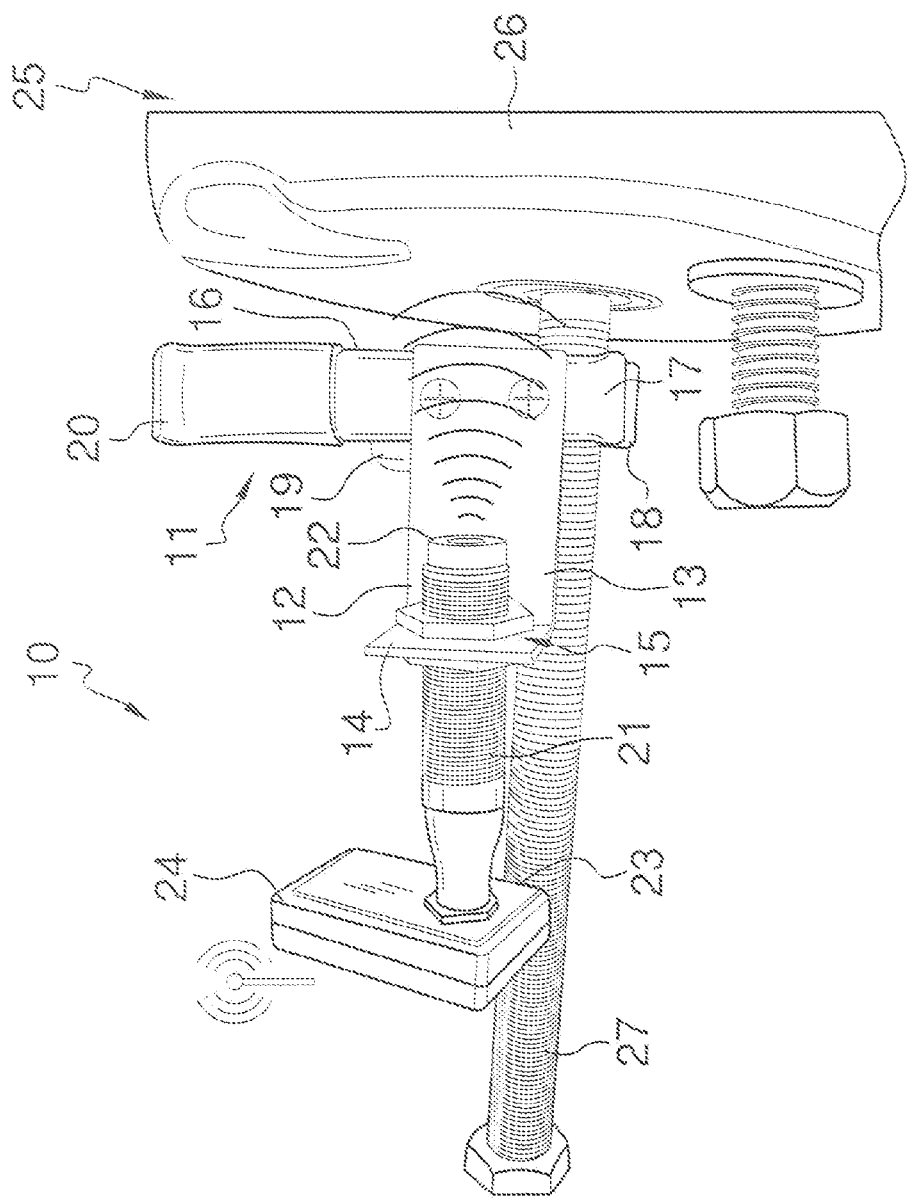
FIG. 1 is a perspective view of the noncontact measurement and wireless transmission system mounted to a pushrod for an air brake chamber.
Figure 1:
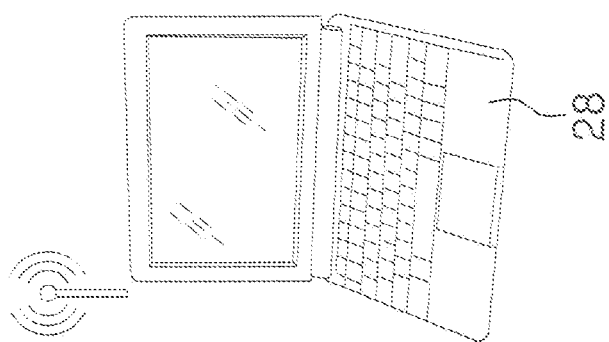
Figure 2:
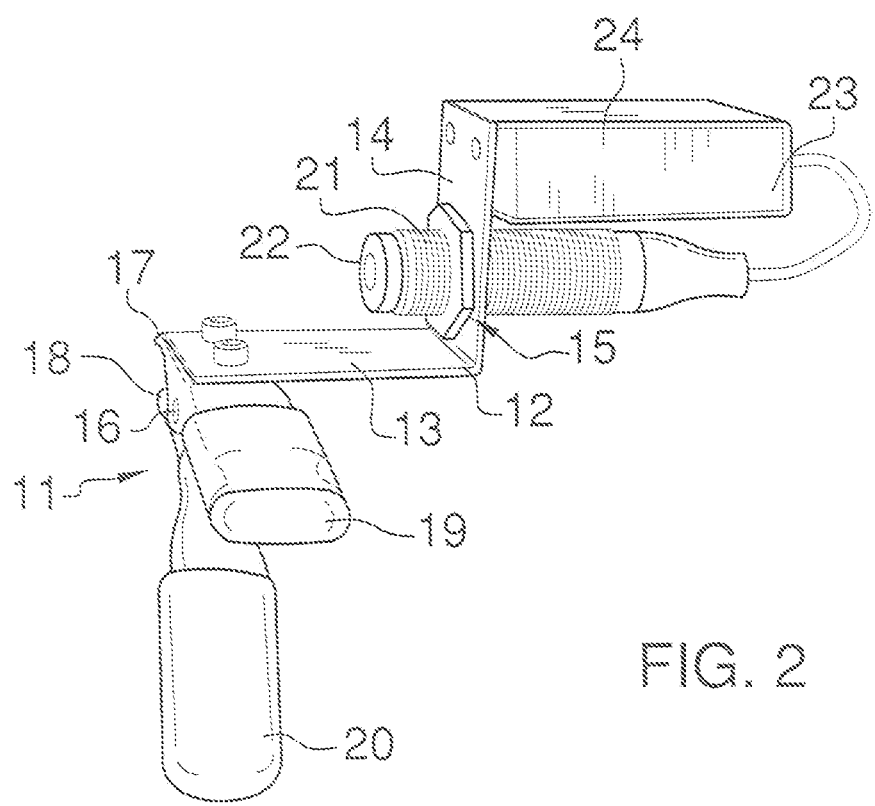
FIG. 2 is a perspective view of a second embodiment of the noncontact measurement and wireless transmission system.

With reference now to the drawings, and in particular to FIGS. 1 through 2 thereof, a new noncontact measurement and wireless transmission system embodying the principles and concepts of the present invention and generally designated by the reference numeral 10 will be described.

As best illustrated in FIGS. 1 through 2, the noncontact measurement and wireless transmission system 10 generally comprises a support member 11; a measurement assembly being supported by the support member 11; and a transmitter 24 being in operable communication and being conventionally connected with the measurement assembly for transmitting output data to a computer system 28 for analysis and to determine via a program as to the distance an object in question traveled relative to another object.

The support member 11 includes a fastening member 16 being removably supported by and conventionally clamped to a first object 27 and also includes a bracket member 12 being connected and fastened with conventional fasteners to the fastening member 16. The fastening member 16 includes a clamp with the bracket member 12 being securely fastened to the clamp 16. The bracket member 12 has a first portion 13 and a second portion 14 being angled from the first portion 13 with the clamp 16 being securely attached to the first portion 13 of the bracket member 12. The clamp 16 includes jaws 17,18 being conventionally biased toward one another, and also includes handles 19,20 being integrally attached to the jaws 17, 18. The first portion 13 of the bracket member 12 is fastened with conventional fasteners intermediate of one of the jaws 17,18 and one of the handles 20.

The first object 27 is a pushrod and the second object 26 is an air brake chamber. Using the jaws 17,18 and squeezing the handles 19,20 together, the clamp 16 is attachable to the pushrod 27 of an air brake 25 and is movable with the pushrod 27 relative to the air brake chamber 26 upon actuation of the air brake 25 about which the air brake chamber 26 is conventionally disposed. The jaws 17,18 of the clamp 16 are removably biased about a portion of the pushrod 27.

The measurement assembly includes a sensor 21 being securely supported by and conventionally fastened to the bracket member 12 and being energized by a power supply such as a battery, and also includes a microprocessor 23 being in operable communication with and functionally and conventionally connected to the sensor 21 for receiving and recording output from the sensor 21 upon the activation and use thereof. The sensor 21 is an ultrasonic sensor capable of transmitting an ultrasonic pulse for measuring a distance between a second object 26 and the sensor 21. The ultrasonic sensor 21 is positioned such that the ultrasonic pulse is transmitted in a direction that is substantially perpendicular to the second object 26 and parallel to the first object 27. The ultrasonic sensor 21 has an end 22 from which the ultrasonic pulse is transmitted. The end 22 of the sensor 21 is facing the second object 26 and is spaced at least 1 inch from the second object 26 when the clamp 16 is supported by the first object 27 to prevent distortion in the output with the ultrasonic pulse being transmittable toward the second object 26. As previously described, the first object 27 is a pushrod and the second object 26 is an air brake chamber with the clamp 16 being attachable and clampable to the pushrod 27 of the air brake 25 and being movable with the pushrod 27 relative to the air brake chamber 26 upon actuation of the air brake 25 about which the air brake chamber 26 is conventionally disposed.

The microprocessor 23 is in operable communication with and functionally and conventionally connected to the sensor 21 to record a time for the ultrasonic pulse to echo back to the sensor 21 after bouncing off the air brake chamber 26 with the time being converted into a distance measurement of what the pushrod 27 traveled upon actuation of the air bake 25. The bracket member 12 has a hole 15 being disposed therethrough with the sensor 21 being securely and conventionally disposed through the hole 15. In one embodiment, the microprocessor 23 is securely and conventionally attached to the bracket member 12. In another embodiment, the microprocessor 23 is securely and conventionally attached to the sensor 21.

The transmitter 24 is a wireless transmitter being in operable communication with and functionally and conventionally connected to the microprocessor 23 and to a computer system 28 for transmitting the output to the computer system 28 for analysis. In one embodiment, the wireless transmitter 24 is conventionally attached to the bracket member 12. In another embodiment, the wireless transmitter 24 is conventionally attached to the sensor 21.

In use, the user clamps the jaws 17,18 of the clamp 16 about a portion of the pushrod 27 making sure that there is at least one inch space between the air brake chamber 26 and the end 22 of the sensor 21 with the end 22 of the sensor 21 facing the air brake chamber 26. The sensor 21, microprocessor 23 and the wireless transmitter 24 are energized by a battery with the sensor 21 transmitting a pulse from the end 22 thereof and with the pulse bouncing off the air brake chamber 26 and echoing back to the sensor 21 with the microprocessor 23 reading and temporarily storing the analog output which is then sent via the wireless transmitter 24 to a computer system 28 which has a program to convert the analog output into a distance measurement whereupon a quick analysis and determination can be made as to the wear and effectiveness of the air brake 25, a process that is crucial to road safety making sure that large trucks in particular have the necessary brakes to be able to stop when necessary or to indicate when it is necessary that the air brake 25 is effectively repaired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the noncontact measurement and wireless transmission system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A noncontact measurement and wireless transmission system comprising:
   a support member including a fastening member adapted to being removably supported by a first object and also includes a bracket member being connected to said fastening member;
   a measurement assembly supported by said support member and including a sensor securely supported by said bracket member and energized by a power supply for transmitting an ultrasonic pulse for measuring a distance between a second object and said sensor, and also including a microprocessor in operable communication with said sensor for receiving and recording output from said sensor, wherein said sensor has an end from which the ultrasonic pulse is transmitted, said end of said sensor facing the second object and being spaced at least 1 inch from the second object when said fastening member is supported by the first object to prevent distortion in the output, said ultrasonic pulse being transmittable toward the second object; and a transmitter in operable communication with said measurement assembly for transmitting data output to a computer system for analysis.

2. The noncontact measurement and wireless transmission system as described in claim 1, wherein the first object is a pushrod and the second object is an air brake chamber, said fastening member being attachable to the pushrod of an air brake and being movable with the pushrod relative to the air brake chamber upon actuation of the air brake about which the air brake chamber is disposed.

3. The noncontact measurement and wireless transmission system as described in claim 2, wherein said microprocessor is in operable communication with said sensor to record a time for the ultrasonic pulse to echo back to said sensor after bouncing off the air brake chamber with the time being translated into a distance measurement that the pushrod traveled upon actuation of the air bake.

\* \* \* \* \*